Oct. 21, 1952

A. H. KIEHL 2,614,464

MOLD ENGRAVING MACHINE

Filed April 21, 1948

INVENTOR
ARTHUR H. KIEHL
BY Ely & Frye
ATTORNEYS

Oct. 21, 1952　　　A. H. KIEHL　　　2,614,464
MOLD ENGRAVING MACHINE
Filed April 21, 1948　　　7 Sheets-Sheet 3

INVENTOR
ARTHUR H. KIEHL
BY Clyo Frye
ATTORNEYS

Oct. 21, 1952 A. H. KIEHL 2,614,464
MOLD ENGRAVING MACHINE
Filed April 21, 1948 7 Sheets-Sheet 4

INVENTOR
*ARTHUR H. KIEHL*
BY *Ely & Frye*
ATTORNEYS

Oct. 21, 1952     A. H. KIEHL     2,614,464
MOLD ENGRAVING MACHINE
Filed April 21, 1948     7 Sheets-Sheet 6

INVENTOR
ARTHUR H. KIEHL
BY Ely & Frye
ATTORNEYS

Oct. 21, 1952 A. H. KIEHL 2,614,464
MOLD ENGRAVING MACHINE
Filed April 21, 1948 7 Sheets-Sheet 7

INVENTOR.
ARTHUR H. KIEHL
BY
ATTORNEYS

Patented Oct. 21, 1952

2,614,464

UNITED STATES PATENT OFFICE 2,614,464

MOLD ENGRAVING MACHINE

Arthur H. Kiehl, Cuyahoga Falls, Ohio, assignor, by mesne assignments, to The Bridgewater Machine Tool Co., Akron, Ohio, a corporation of Ohio Application April 21, 1948, Serial No. 22,277

2 Claims. (Cl. 90—13.7)

The present invention relates to machines for engraving non-skid patterns in tire molds and, while the invention has its primary utility in this particular field, it is possible that it may be extended to machines designed for other purposes.

Machines of the type to which the invention is particularly adapted generally comprise a rotating table to which the mold section is clamped, a spindle carrying the rotating cutting tool which is pivotally mounted at the center of curvature of the mold surface in which the tire tread design is to be cut, and a template or pattern which contains one or more reproductions of a unit of the design and is rotated concurrently with the rotation of the table. Cooperating with the template is a stylus or pattern follower which is operatively connected to the pivoted tool support, so that by guiding the stylus over the template, the machine will reproduce the design in the mold.

The invention has been brought about by the development in the tire art of tread designs of variable pitch. It has been found that a repetition of the same pattern of equal extent around the tire gives rise to periodic vibrations in the tire which creates objectionable noise.

To overcome this objection, the tire companies have developed and use various forms of irregular tread design in which the same basic unit of design is employed around the tire, but the units are of varying arcuate extents or pitches. While a casual glance at a tire of this type gives the impression that the tread design is uniform about the tire, closer examination will show that the tread is really broken up into areas which contain units of several different arcuate proportions scattered over the tread in such a way that rhythmic vibrations are not set up. Usually three different arcuate lengths are adopted and they may be distributed in all sorts of groupings around the tire, as the tire designer may elect, each company having its own ideas as to how the designs should be arranged.

This development in variable pitch tire-tread designs has created serious problems for concerns which engrave the molds. Until the development of the machine shown herein it has been the practice to operate the machines so that all of the sections of one pitch scattered around the mold are first cut. Then the machine is reset for a second pitch of unit design and these units are then cut in the mold. Then the machine is set for the third pitch of unit design.

It would, of course, be possible to reset the machine after each single unit, or group of units of one length is cut, but such a procedure would be even more laborious than the practice which is usually employed of cutting all units of the same pitch before resetting the machine for units of another pitch.

The demand for molds with variable-pitch tread designs cut therein has greatly increased the cost of mold production because of the resetting operations which consume much time and require extremely accurate setting. Unless the calculations are accurately made and followed the machinist will find that his various cuttings do not match.

It is, therefore, the purpose of the present invention to design a machine of this type which will relieve the machinist of much of the work which is created by the irregular tread designs. With the development of the machine shown, he may proceed about the mold in a continuous operation, a simple manipulation changing the relative speed of the template to the speed of advancement of the mold whenever the design calls for a change in the pitch of the unit. The mechanism for changing the cutting area of the tool as it follows a single unit of the pattern is so designed and coordinated that the finished design will come out perfectly.

While the machine is shown and will be particularly described with reference to the cutting of the tread portion of the tire design which is in the arcuate portion of the mold cavity, the invention may be adapted to the cutting of flat areas as well. It is well known in the art that machines of this type may be converted to cutting flat areas, such as form the shoulders of the tire and if the irregular tread design is carried down onto the shoulders of the tire, the invention may be used with such converted machines.

It is also an object of the invention to combine the pattern control for the cutting tool with mechanism for varying the extent of arcuate movement which is conveyed from the template to the pivoted tool. The necessity for this combination arises from the wide divergence in tread designs. Some tire companies employ a very large and rugged pattern while others use a finer pattern, or the same company may employ both types. The pattern is usually several multiples of a unit of the actual design so that the tool moves to a lesser extent than the stylus. If a machine were not equipped with means varying the ratio, a template for a tread design of large proportions would be so large as to make it impractical to mount it on a standard machine.

In the drawings and description the best-known and preferred form of the invention is shown and described but the machine may be modified or improved without sacrificing any of the essential features of the invention as set forth in the appended claims.

In the drawings:

Fig. 3 is a section on the line 3—3 of Fig. 2;

Fig. 3ª is a section on the line 3ª—3ª of Fig. 3;

Fig. 4 is a section on the line 4—4 of Fig. 3 showing the means for varying the ratio between the movement of the stylus or pattern follower and the extent of arcuate movement of the tool;

Fig. 5ª is an enlarged section on the line 5ª—5ª of Fig. 5;

Fig. 16 is a view of a simple but typical form of irregular tread design. In this view is shown the engraved surface of the mold which is the obverse of the design on the tire. The design conforms to the template which has been illustrated in other views.

Figures 3, 3A, 16:
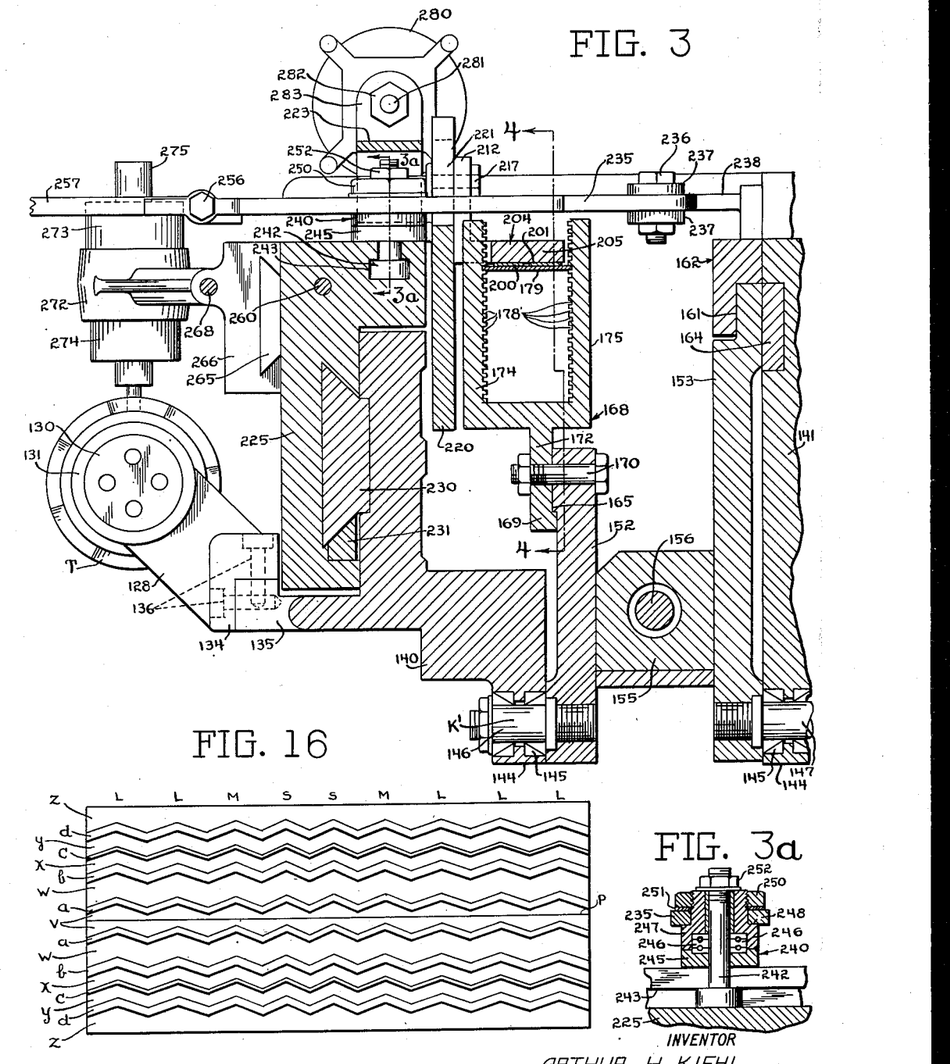

Referring first to Fig. 16: This view shows a fragment only of a mold surface such as may be cut, and illustrates the manner in which the various units of length may be scattered over a portion of a tire. It will be appreciated that this is only a fragment of a typical variable pitch tread design and represents only a small portion of the complete circumference. In this particular segment of the design there are shown a plurality of units of varying pitches indicated by "L" for large, "M" for medium and "S" for small. In this particular tire design the same arrangement of large, medium and small units is not repeated around the tire for at other portions of the tire the arrangement is quite different.

This particular design has been selected because it is a popular saw-tooth tread design and is quite simple and easy to follow. The line p represents the split or parting line of the mold, each section of a complete mold containing four ribs a, b, c, and d which create the grooves in the tire tread. Between these ribs are the low areas v, w, x, y and z, which form the ribs in the finished tire, which areas represent the stock removed from the mold by the cutting tool. The template T shown in Fig. 6 corresponds to the pattern cut in one mold section, the ribs and valleys bearing the same reference letters. It will be noted, however, that the pitch of the saw teeth, or the length from apex to apex, is the same around the entire template, and also that the pattern on the template is much larger than the pattern as reproduced in the mold. The increase in the size of the template over the pattern in the mold is desirable for a fine reproduction in the mold.

Figures 1, 7:
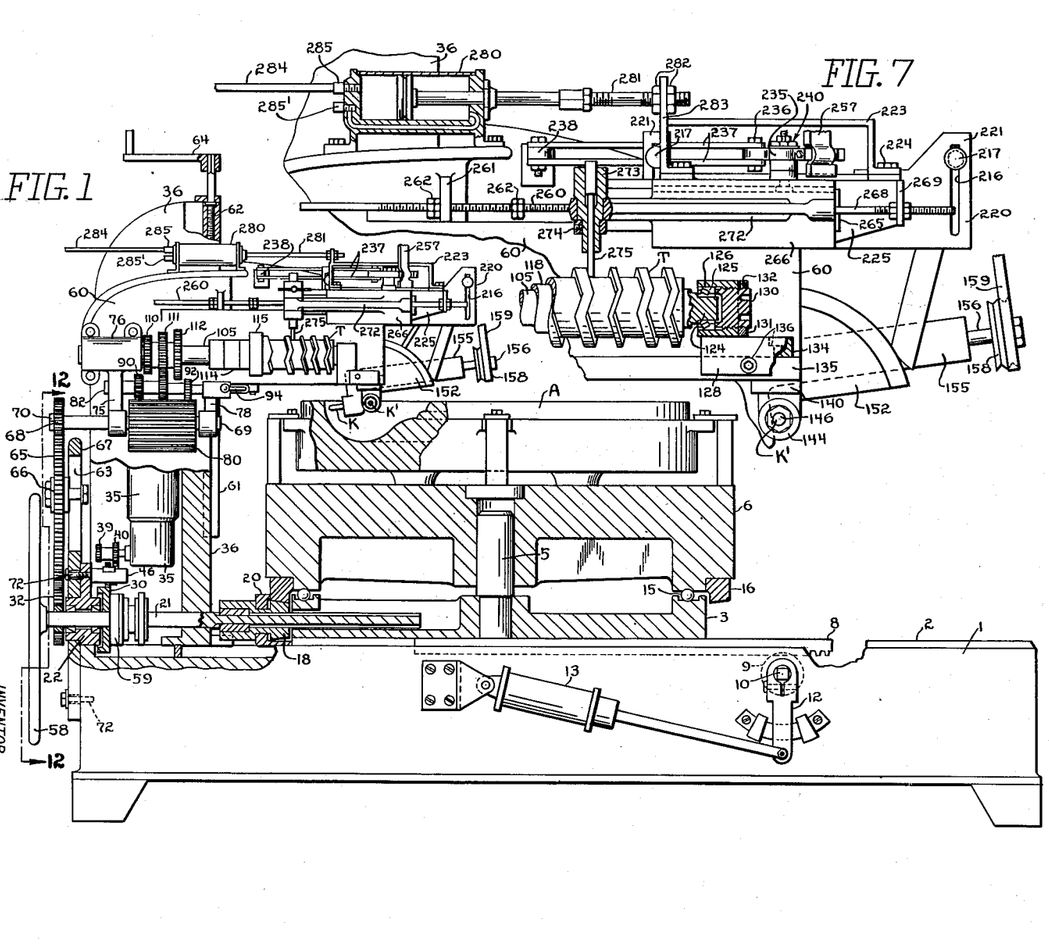
Fig. 1 is a side elevation of the machine constituting the preferred embodiment of the invention. In this view the parts of the machine constituting the drive for the table are shown in section.
Fig. 7 is an enlarged view of the head, parts of the view being in section.

The machine is mounted on a base 1 provided on its upper surface with ways 2 on which is slidably mounted the carriage 3 in the center of which is the post 5 carrying the rotatable table 6. The mold section A is clamped to the table as indicated in Fig. 1 of the drawing. To adjust the table for molds of differing diameters the underside of the carriage is provided with racks 8 which are engaged by pinions 9 on a shaft 10 extending through the base. Any means may be provided for moving the table, the crank arm 12 and the power cylinder 13 being shown for this purpose.

The table is mounted on the carriage by a frictionless bearing 15 and on the underside of the table is the circular rack 16 which rotates the table as cutting progresses, through a pinion 18 having an elongated shank grooved to receive a bearing collar 20 fixed to the carriage. The pinion 18 is feathered on the forward end of an elongated drive shaft 21, the inner end of the shaft being mounted in an elongated bearing block 22 mounted at the rear of the bed 1.

On the shaft 21 adjacent bearing 22 is the table driving gear 30 and on the rear projecting end of the shaft 21 is the gear 32 which, through mechanism to be described, rotates the template T.

The machine shown herein is intended to be driven by a motor 35 mounted on a hollow stanchion 36 on the bed plate 1. This stanchion is a heavy casting which houses the motor and the drive elements for the table. It is broken away in Fig. 1 to disclose some of the mechanism therein. It is desirable to provide for selective high and low speeds for rotating the mold and the template and for this purpose mounted on the motor shaft 38 are the large and small pinions 39 and 40 which are designed to mesh with the idle gears 41 and 42. The larger gear 42 is always in mesh with the gear 30 which is of sufficient width to permit the shifting of the idle gear assembly. The gears 41 and 42 are carried by a sleeve 44 slidably mounted on an idle shaft 45 which is mounted in a U-shaped bracket 46 carried by the bearing block 22.

Figures 12, 13, 14, 15:
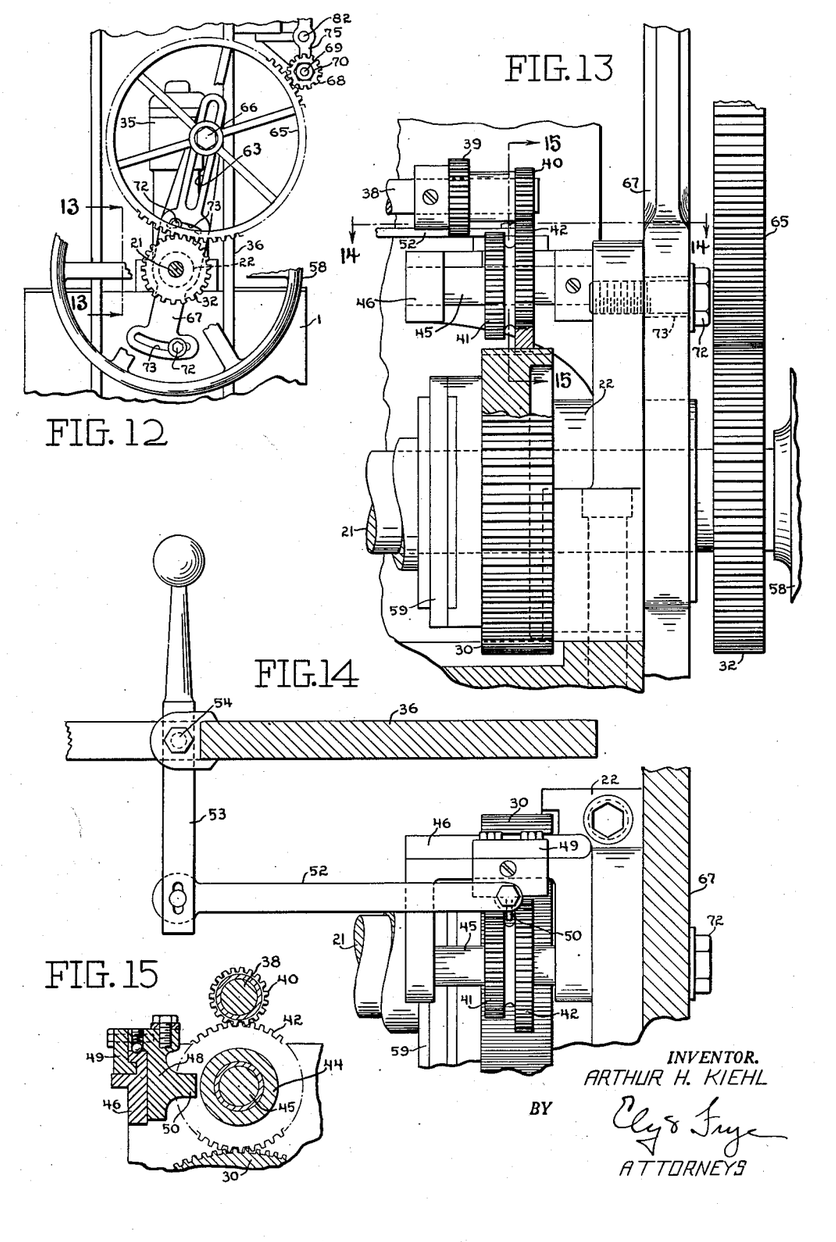
Fig. 12 is a view looking from the rear or left-hand side of the machine, the location of this view being indicated by the line 12—12 on Fig. 1.
Fig. 13 is an enlarged view along the line 13—13 of Fig. 12.
Figs. 14 and 15 are sections on the lines 14—14 and 15—15 respectively of Fig. 13.

Slidably mounted on the bracket 46 is a carriage composed of the two plates 48 and 49, the latter having a rib engaging a corresponding rib in the bracket 46. Projecting from the plate 48 is a pin 50 which enters the space between the gears 41 and 42 and to the plate is pivotally connected a link 52 connected at its outer end to a lever 53 pivotally mounted at 54 on the stanchion 36. In Fig. 1 the machine is shown at high speed and in Fig. 13 the machine has been put in low speed.

It is desirable in a machine of this type to provide for hand operation as well as motor operation because the machinist may desire to go over the mold to touch up certain portions of the design in the mold. For this purpose the shaft 21 has secured on its inner extremity a hand wheel 58 and the gear 30 is not mounted directly on the shaft 21 but is fixed to one element of a positive clutch 59, so that in hand operation the machinist is not required to turn the motor and the intermediate gearing. Clutches for this purpose are well known and therefore details thereof are not shown.

The cutting tool and template and the means for driving them are mounted on a head 60 which is vertically adjustable on guides 61 carried on the face of the stanchion 36. A threaded shaft 62, the lower end of which engages the head and the upper end of which is journalled in the top of the stanchion provide the means for raising and lowering the head for varying sizes of molds. A removable crank 64 is placed over the upper end of shaft 62 when the head is to be adjusted. Clamping screws (not shown) hold the head in its fixed position on the stanchion.

As shown in Fig. 1 the head is a heavy casting which projects over the mold, the lower forward corner of the casting supporting the cutting tool K which oscillates about the point K' located, during cutting, at the center of curvature of that portion of the mold which is being engraved. This center is located with respect to the mold by adjusting the carriage 3 and the head 60.

The template T is rotated in precise timed relation to the rotation of the mold by the gear 32, which meshes with a large gear 65 carried on a bearing 66. The bearing 66 is slidably mounted in a slot 63 formed in the upper portion of a swinging arm 67 which is rotatable about the bearing 22. The gear 65 meshes with a pinion 68 held on the rear end of the shaft 69 by a nut 70. The shaft 69 drives the template through the intermediate gearing to be described. In order that the gear 65 will mesh with the gears 32 and 68 at all elevations of the head, the arm 67 is rotatably adjusted around the axes of the shaft 21 and is held in adjusted position by bolts 72 threaded into the bearing 22 and the rear of the base. The bolts pass through arcuate slots 73 in the arm above and below the center of rotation of the arm.

Figures 6, 8:
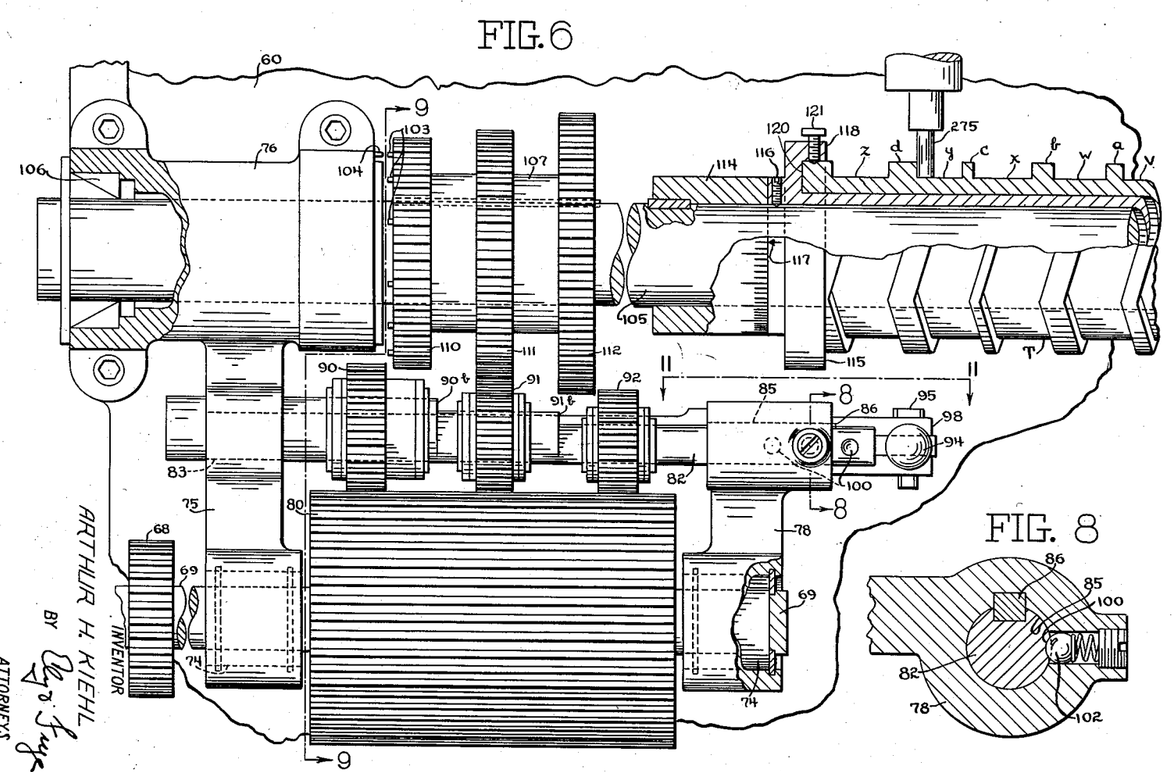
Fig. 6 is an enlarged view of the drive mechanism for rotating the template.
Fig. 8 is a section on the line 8—8 of Fig. 6.

The shaft 69 is supported on roller bearings 74, the bearing to the left as viewed in Figs. 1 and 6 being carried in an arm 75 depending from a large housing 76 which is attached to the head. At its other end the shaft 69 is mounted in a bracket 78 carried by the head. Between the brackets 74 and 78 there is keyed to the shaft 69 a long driving gear 80.

Spaced above the gear 80 and parallel to the face thereof is the sliding gear-changing shaft 82 by which the pitch of the pattern is changed. This is an idle shaft and is mounted for lengthwise sliding movement in a bearing 83 in the arm 75 and in a bearing 85 in the bracket 78. To keep this shaft from turning in its bearings, a key 86 and keyways are provided between the shaft 82 and the bearing 85. This shaft carries three intermediate change gears which vary the ratio of movement of the template T with the rotary advance of the mold A. The gears are three in number because the machine shown and described is intended to cut three different lengths of pattern units, but if four or more lengths of units were to be cut the transmission would be redesigned for that type of tread design.

Figures 9, 10, 11:
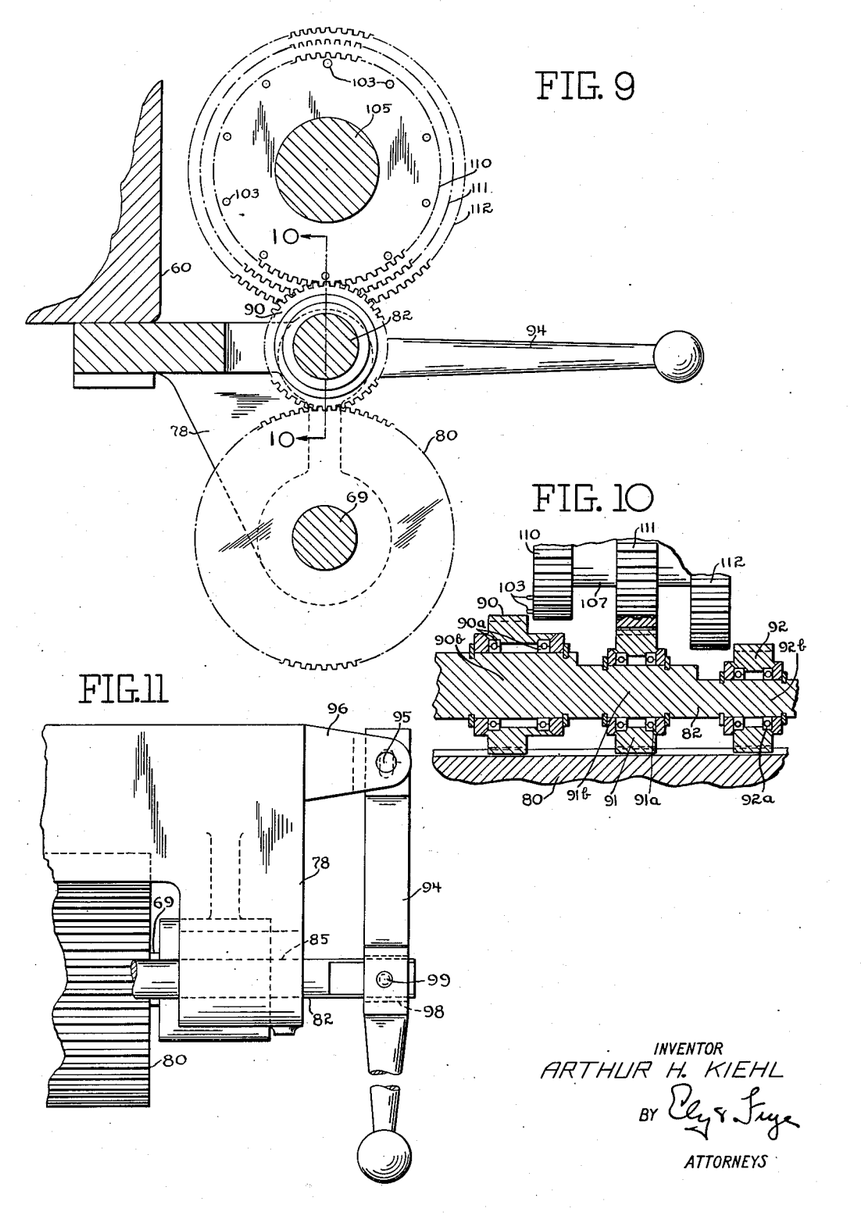
Fig. 9 is a section on the line 9—9 of Fig. 6.
Fig. 10 is a section on the line 10—10 of Fig. 9.
Fig. 11 is a view looking downwardly from the plane indicated by the line 11—11 in Fig. 6.

The intermediate change gears are designated from left to right in order of their size as 90, 91 and 92, these gears being mounted to rotate freely on frictionless bearings 90a, 91a and 92a fixed to the shaft 82. In order that the pitch line of the three gears may coincide with the pitch line of the gear 80, by which they are driven, the shaft is progressively stepped down from left to right as shown in Fig. 10 providing the hubs 90b, 91b and 92b on which the respective bearings are mounted.

The shaft 82 is shifted to make the appropriate change in the transmission between the mold table and the template by a lever 94 which is pivoted at 95 to a forked bracket 96 formed as a part of the bracket 78. The forward end of the shaft 82 is flattened and received in a slot 98 in the lever 94 and pivoted to the lever at the point 99.

In order to hold the shaft in adjusted position, the side thereof at the point where it passes through the bearing 85 is provided with three shallow sockets 100 corresponding to three positions in which the shaft is to be held, and in the side of the bearing is located a ball or other spring-held detent 102 which snaps into one of the sockets 100 when the shaft 82 is correctly positioned.

Above the shaft 82 is located the template supporting shaft 105 which is mounted at its rear end in a roller bearing 106 in the housing 76. Keyed to the shaft 105 is a sleeve 107 to which are welded the three driven gears 110, 111 and 112 which increase in diameter progressively from left to right and are designed to engage with gears 90, 91 and 92, respectively, depending upon the position of the shaft 82. As shown in the drawing, the gears 91 and 111 are in mesh and therefore the shaft 105 and the template are rotating at the intermediate speed which would reproduce in the mold pattern units of intermediate length. When the gears 92 and 112 are in mesh the template rotates at its slowest speed and, as the mold is rotating at a constant speed, this setting of the change gears produces in the mold pattern units of the maximum pitch or arcuate length. When the gears 90 and 110 are engaged the template will rotate at its highest speed and therefore pattern units of short length will be reproduced.

At this point it is necessary to refer to an important element of the invention which makes it possible for the machinst to cut any combination of long, medium or short pattern units in the mold and yet to have the design come out perfectly with each cutting around the mold matching with the other cuttings. This requires operations of the utmost precision, otherwise a costly mold will be ruined. It will be recalled in this connection that the machine is designed so that the machinist may cut at one level about the entire circumference of the mold without shifting to another level.

All of the gearing from the mold table, rotating gear 18 and rack 16 through the train of gearing up to the shaft 69 and thence through the variable transmission provided by the large gears 80, intermediate gears 90, 91 and 92 to the gears 110, 111 and 112 is accurately cut. The gears 90, 91 and 92 and the gears 110, 111 and 112 are so cut that the shaft 82 cannot be shifted except at a definite division of the complete cycle of rotation of the shaft 105. This result may be accomplished by making the numbers of gear teeth on the gears 110, 111 and 112 multiples of a common denominator. For example, if the teeth in gears 110, 111 and 112 are 90, 100 and 110, respectively, the teeth will be in alignment across the gears at 10 points only and it is only at these points that the intermediate gears will engage with any one of the upper gears. Of course the same result may be accomplished by adopting any common denominator.

Ten has been chosen for the common denominator of the teeth in the three gears shown herein and on the rear side of the gear 110 are located ten equally spaced pins 103 (Fig. 9) which are so located that only when one of these pins 103 is in register with a master pin 104 mounted in the side of the housing 76 adjacent the face of the gear 110 will the teeth on the several gears be in alignment at lowermost points in the gears 110, 111 and 112 where they will be engaged by the gears 90, 91 and 92, respectively.

As it is desirable to change the pitch of the pattern units at definite points in the complete cycle of the mold table, the machinist cannot make a shift in the pitch of the cutting teeth except at points which may be determined in advance and thus the pattern cut during one revolution of the mold will coincide with the pattern cut during the other revolutions. To keep track of the points at which the pitch change occurs, the machinist marks on the table below the mold the approximate points at which the change should be made and as the table rotates and as these marks approach a stationary point he prepares to make the shift in the transmission but can only do so when one of the pins 103 comes into alignment with the master pin 104.

Keyed to the shaft 105 beyond the sleeve 107 is an indexing sleeve 114, the forward edge portion of which is marked off with a scale divided into degrees for accurate setting of the template T. Over the shaft 105 and positioned directly against the sleeve 114 is a template holding sleeve indicated as a whole by the numeral 115. The rear end of the sleeve 115 is reduced to the same outer diameter as the indexing sleeve 114 and through this part of the sleeve is threaded a set screw 116 which fixes the sleeve 115 to the shaft. On the edge of this portion of the sleeve 115 is placed a mark 117 which cooperates with the scale on the indexing sleeve. The machinist will be able to adjust the template about the shaft to a definite position by loosening the screw 116 and shifting the sleeve 115 about the shaft until the marker 117 comes to the correct place on the scale. This refinement of the machine may be used when the machinist finds it necessary to remount a mold for recutting a portion of the pattern in the mold and it enables him to set the template accurately for this purpose to correspond to his original cutting.

The larger portion 118 of the sleeve is provided with a circumferential recess 120 on its front face, the remainder of the sleeve being reduced to receive the template T which is an outer sleeve fitting over the main portion of the sleeve 115, the inner end of the template being held in position by a bolt 121 passing through the overhanging portion 118 and entering a threaded hole in the template.

The outer or far end of the shaft 105 is reduced as shown at 124 where it is received in a roller bearing 125 mounted in a passage 126 formed in an upwardly extending arm of an angular bracket 128. The outer end of the passage is internally threaded and in this portion is received the threaded plug 130, the inner end of which holds the bearing 125 in place. A lock washer 131 is threaded on the extended end of the plug 130 and is held in position by a set screw 132.

The bracket 128 has a forwardly extending arm 134 which is channeled to fit a rib or guideway 135 which is formed on the lower outer corner of the head 60. Set screws 136 passing through the top and side of the arm 134 clamp the bracket in position on the guideway.

To change the template the machinist loosens the screws 136 and shifts the bracket 128 outwardly and backs off the bolt 121. He then slips the template off the sleeve 115. As the template is located at a definite point on the sleeve 115 by the bolt 121, it is always in fixed relation to the shaft 105.

The head 60 is formed with two parallel spaced arms, the arm toward the template being designated on Fig. 3 as 140, and the opposite arm as 141. The lower forward ends of these arms are formed with downwardly extending lugs 144 in which are located aligned roller bearings 145 which form the pivot point K' for the cutting tool K. In these bearings are mounted the ends of pins 146 and 147 which form the pivotal bearing for the cutting tool carriage or sector.

The sector or tool carriage is made up of two parallel plates 152 and 153, the former being adjacent the arm 140 and the latter adjacent the arm 141. The plate 152 receives the threaded end of pin 146 and the plate 153 receives the threaded end of pin 147. Between the plates 152 and 153 is fixed the spindle bearing block 155 in which is rotatably mounted the spindle 156 which drives the cutting tool K through gearing in the head of the carriage. This mechanism is well known in the art and is not shown. The outer end of the spindle is provided with the stepped pulleys 158 by which the spindle and cutting tool are rotated at high speed, from a power source, by the belt 159.

The plate 153 is formed along its upper edge on an arc and is stepped back as shown at 161 in Fig. 3 and overlapping this portion of the plate is the arc-shaped guide rail 162 which steadies the tool carriage in its oscillating movement about center K'. The upper rear edge of the plate 153 is machine finished and bears against a machine-finished strip 164 set in the arm 141.

The plate 152 is formed on a much shorter radius than the plate 153 and around the upper edge of the plate is provided the arcuate rib 165 which serves to locate the propelling unit for the tool carriage. This propelling unit or driver for the tool carriage is given the general reference numeral 168. It is a generally arc-shaped member, the lower edge of which is formed with a rib 169 fitting against the rib 165 and held in position by the series of bolts 170 shown in Figs. 3 and 4.

It will be recalled that in the general discussion it was stated that a machine embodying this invention should have some provision for varying the stroke of the cutting tool as it sweeps in an arc over the surface of the mold with relation to the movement of the stylus over the template. This was to provide for variable sizes of templates, it being impractical to make all templates on the same scale because of differences in tread designs. It also provides for cutting molds of different sizes from the same template. If templates of different scales were employed without means for varying the arc over which the cutting tool is moved thereby the tread design would not be correctly reproduced in the mold, and likewise if the same template were used for different size molds the tread design would be incorrectly reproduced. The propeller or driver for the cutting tool in this machine is equipped with means for reducing or enlarging the stroke of the tool with relation to the amplitude of stylus movement induced by the rotating template. This will now be described:

The driver 168 is formed with a centrally located rib 172 which is held against the plate 152 as described. Above the rib the driver is provided with two parallel oppositely facing walls, the left-hand wall in Fig. 3 being designated as 174 and the right-hand wall as 175. The opposing faces of these walls are engraved with a plurality of finely cut arcuate grooves 178, and in a pair of opposed grooves are received the edges of a flexible steel band 179.

This band may be shifted to and from the axis of the sector by insertion from the edge of the driver in a selected pair of grooves. The band is flexible to conform to the curvature of the grooves but is sufficiently rigid to resist bending forces, which would tend to unseat it.

On the front edge of the wall 174 is an angular plate 180, the short arm of which is held against the outer surface of the wall by screws 181 and the long arm of which extends over the space between the walls 174 and 175. Likewise, but reversely positioned on the inner edge of the wall 175, is attached the angular plate 182 which overlies the space between the walls 174 and 175 in the opposite direction. These plates are identical except for their reverse positioning.

Each plate is provided with a long vertical slot 184 and the face of each plate is formed with a plurality of horizontal grooves 185. Located against the rear of the plate 180 is a block 186 and against the rear wall of the plate 182 is a block 187. Each block has a tongue which engages the slot 184 and from this tongue extends a screw 188. Received over the screw is a plate 189, the rear face of which is ribbed to fit in several of the grooves 185. A nut 190 threaded on the end of the screw holds the block assembly in its adjusted position on the plate 180 or 182 as the case may be. Extending into each block 186 or 187 is a bolt 192 which, through a washer 194, secures the end of a driving band to each block.

Figure 2:
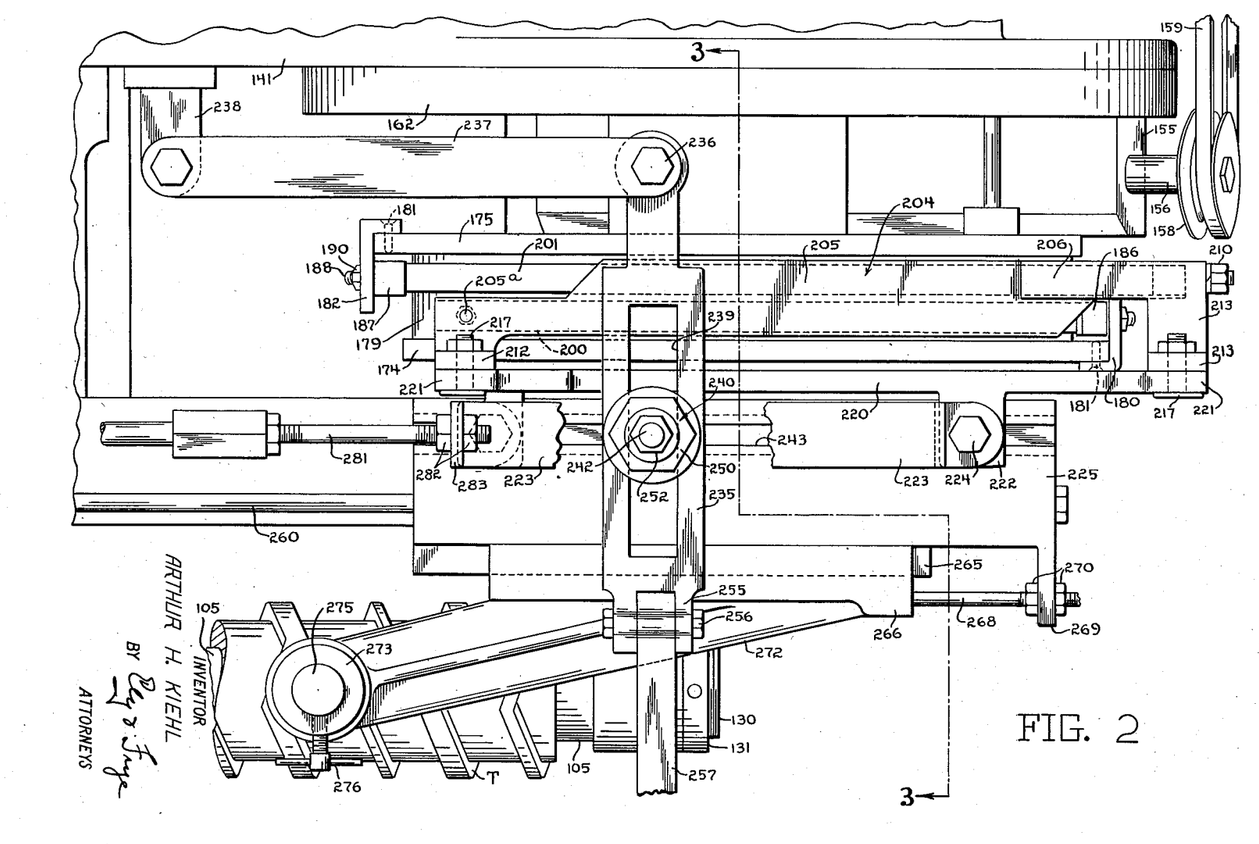
Fig. 2 is a plan view of the forward portion of the head of the machine showing the mechanism for shifting the stylus over the pattern.
Figures 4, 5A:
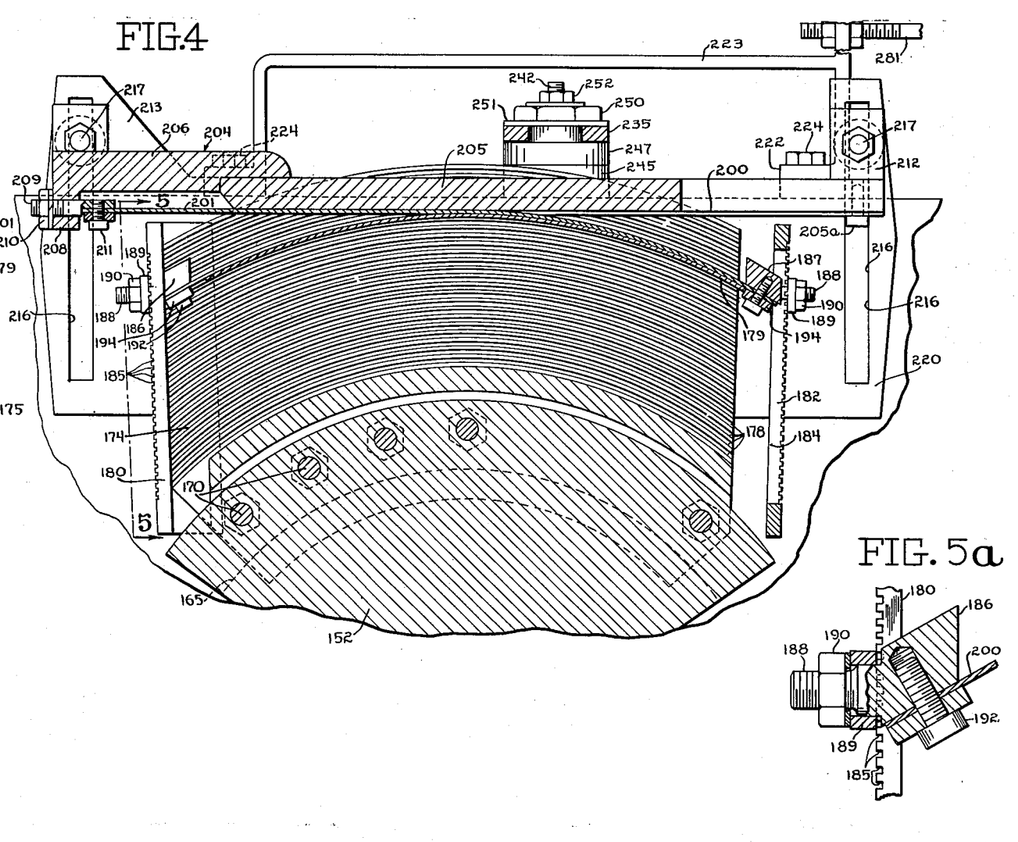
Figure 5:
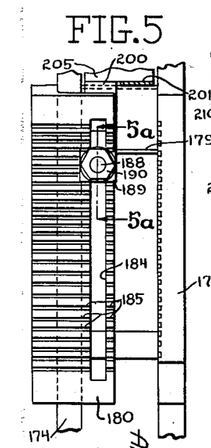
Fig. 5 is a section on the line 5—5 of Fig. 4.

As shown in Figs. 2 and 4, there are two parallel driving bands which oscillate the tool carriage, the one band exerting a pull to the rear to rotate the tool carriage in a counterclockwise direction, as viewed in Fig. 1, and the other exerting a pull to the front to rock the tool carriage in a clockwise direction. The bands are pulled to and fro by the stylus or pattern follower through the mechanism to be described. The pull to the rear or left of the machine as shown in Fig. 1 which lowers the cutting tool in the mold is exerted by the band 200 which is attached at its outer end to the block 186 on the plate 180. The pull to the front or right of the machine as shown in Fig. 1, which raises the cutting tool in the mold, is exerted by the band 201 which is attached at its outer end to the block 187 on the plate 182. As shown in Figs. 2 and 3, these bands lie side by side and bear upon the band 179, the bands 200 and 201 wrapping about the band 179 as the tool carriage is oscillated.

The driving bands 200 and 201 are attached to opposite ends of a long plate bearing the general reference numeral 204 which overlies the band 179 and the two bands 200 and 201. This plate is best shown in Figs. 2 and 4. It has a long central portion 205 which lies between the walls 174 and 175, the underside of this portion of the plate contacting with the tangential portion of the driving bands as they flex over the adjustable band 179. The end of the band 200 remote from its block 186 is attached to the left-hand end of this portion of the plate (as viewed in Fig. 2) by an anchoring pin 205ª. The opposite end of the plate 204 is formed by a supplemental plate 206 welded to the end of the main body of the plate and on the end of 206 is a depending lug 208 through which is threaded a bolt 209 held in position by the nut 210. The inner end of this bolt is flattened and the end of the band 201 is anchored to the bolt 209 by a second bolt 211. Thus, as the plate 204 is moved back and forth between the walls 174 and 175, the tool carriage will be rocked about its pivot K'.

The end of plate 204 adjacent the pin 205 is provided with an upstanding lug 212 and at the opposite end is a second lug 213. These lugs are employed to fasten the plate 204 to a reciprocating plate 220, the ends of which are provided with upstanding ears 221 opposed to the lugs 212 and 213. Near the ends of the plate 220 are located long slots 216 which are for the purpose of adjusting the height of the horizontal plate 204, bolts 217 passing through the ears 221 and into the slots. By this means the plate 204 may be vertically adjusted so that its lower surface is always tangent to the upper surface of the bands 200 and 201 at whatever height the adjustable band 179 may be located.

When the machinist desires to change the arc of the cutting tool, he will unfasten the ends of the bands 200 and 201 from their blocks 186 and 187 and remove one of the plates 180 or 182. He may then remove the band 179 from the slots in which it may be situated and reposition it in another pair of slots closer to or more remote from the pivot K'. He then replaces the plate in the rocker and lowers the driving plate 204 to bring it to a position of tangency with the plate 179.

The plate 220 is formed on its outer face with two arms 222 which rest on the top of a slide 225. Extending from one arm across the arms 222 is a bridge piece 223, the legs of which are turned as shown in Fig. 4 and fastened to the arms 222 and to the slide 225 by bolts 224.

The slide 225 is mounted for reciprocating movement on a dovetailed guideway 230 set in the face of the arm 140 on the head 60, the guideway being shimmed by a gib 231 shown in Fig. 3. This slide is moved to and fro to rock the tool carriage by a hand lever 235 which is pivoted at 236 to a double link 237 which is in turn pivoted on a bracket 238 mounted on the head 60. The main arm of lever 235 is provided with a slot 239 in which is slidably received a pin assembly indicated as a whole by the numeral 240.

This pin assembly is shown in detail in Fig. 3ª. It comprises a T-bolt 242 the head of which slides in a correspondingly shaped longitudinal slot 243 located in the slide 225. The shank of the bolt 242 extends through a block 245 in which is located the ball bearing 246. Over the bearing is a sleeve 247 having a reduced extension providing a shoulder 248, and having its outer extremity threaded. The extension passes through the slot 239 in the lever 235 and on the outer end of the extension is threaded the nut 250 which bears upon a washer 251 which rests upon the upper surface of the arm 235. A nut 252 on the end of the pin 242 draws the pin assembly together to lock it to the slide 225. By this means the location of the arm 235 relative to the slide may be adjusted.

The end of the lever arm 235 is forked as shown at 255 and pivoted at this point on pin 256 is the swinging operating handle 257 by which the machinist moves the slide 225 and the parts carried thereby to rock the tool carriage. The purpose of hinging the handle 257 is so that it may be raised as shown in Figs. 1 and 7 when the machine is idle or when the machinist is making ready. The purpose of providing the fore-and-aft adjustment of the pin assembly 240 is to permit the machinist to locate the operating lever for its most convenient position. The machinist usually operates the lever with one hand and, while the motor may be inactive to rotate the mold table, he will operate the hand wheel 58 with the other hand.

To limit the movement of the slide 225, a rod 260 having a head at its outer end is slidably received in a passage in the slide, the rearward extension of this rod passing through a bracket 261 on the head 60. Nuts 262 threaded on the rod 260 form stops which prevent the slide from being moved beyond the limits set thereby.

On the face of the slide 225 is a dovetailed rib 265 on which is slidably mounted the carriage 266 which supports the stylus or pattern follower. It is necessary for the machinist to adjust the position of the slide 225 before starting each operation to assure that the position of the cutting tool is properly located with respect to the position of the stylus on the template T. If the relation of these parts were not correctly made before cutting starts the tread pattern would not be correctly located in the mold. For this purpose a tie rod 268 is fixed in the forward end of the stylus carriage 266 and extends into a bracket 269 formed as a part of the slide 225. The end of the rod 268 is threaded and nuts 270 hold the carriage 266 in its correct adjusted position on the slide 225.

From the carriage 266 is extended rearwardly of the machine the rigid arm 272 in the outer end of which is located a housing 273 which is held in position by the clamp ring 274. This housing is provided with a vertical passage to receive the stylus 275 which is a long pin, the lower end of which rides in the grooves or low places in the template. The pin is clamped in the housing by a set screw 276 so that it may be lifted out of housing when a template is changed or when the stylus is to be shifted from one groove to another of the template.

While the machinist will shift the stylus over the template by the hand lever as cutting proceeds, it is desirable to provide means to assist the machinist in following the pattern on the template. For this purpose a pneumatic cylinder is provided which can be selectively operated to press the stylus toward either side of the raised formations in the pattern on the template. Such a cylinder is mounted on the head 60, as shown at 280, the piston rod 281 being extended and adjustably fixed by the nuts 282 to an extension 283 from the bridge piece 223. As shown in Fig. 7, the cylinder is arranged so that by shifting the pressure-supply pipe 284 from one inlet 285 to the other inlet 285' the pressure exerted by the cylinder will urge the stylus either to the right or to the left.

Operation

It is believed that the operation of the machine will have been made clear but the following will give a brief résumé of the principal parts and functions thereof.

Before the machinist starts the operation of engraving the mold the ratio of amplitude of the cutting tool with the width of the pattern in the template together with the diameter of the cutter and the diameter of the stylus have been predetermined. The machine is then set up to suit these specifications. The machinist then sets the slide 266 so that the position of the stylus in the template is properly coordinated with the cutting tool in the mold.

When the factors recited are properly adjusted the machinist marks on the table the approximate points at which the pitch of the design will be changed so that as the table approaches a point where the change is to be made he will shift the transmission, but as he can only make the shift when one of the pins 103 on gear 110 coincides with the master pin 104 he cannot make the shift except at points which will insure that the design comes out perfectly.

Because of this arrangement he may start one groove or level of cutting and continue at that level around the entire mold, making the pitch changes as they occur. When he has cut all around the mold he shifts the stylus into the next groove and starts the cutting at the next level. When the pitch changes occur during this cutting operation he makes the necessary changes in the transmission at the same points that he made the changes in the first cutting and as he makes the changes at the same point in cutting each round, the variations in the tread design will always align across the mold.

During the cutting operation he moves the stylus back and forth in the groove until the stock is cut away and in this operation he uses the hand lever 235, assisted by the pneumatic cylinder. He may rotate the table through the motor or through the hand wheel 58 as he may see fit.

It will be seen that the machine provides for a combination of automatic and hand operation but that the organization is such that the machinist is relieved of much of the labor formerly required to cut an intricate pattern accurately and continuously at one level. The machine is so designed that, by following a simple procedure, the machine must correctly reproduce the desired variable pitch, non-skid tread design.

While the machine has been shown and accurately described in great detail, it will be understood that details are not essential to a realization of the benefits of the invention and that changes and modifications may be made without departure from the basic principles of the invention as set forth in the claims. While the machine is especially designed for a rotating template, this is not essential and the template may be of any type as is well known in the art. The invention is also illustrated in connection with cutting the curved surface of the tread but it may be modified to cut plane surfaces such as may occur at the shoulder to the tire mold.

What is claimed is:

1. A tire mold engraving machine comprising the combination of a rotatable mold supporting table, means for rotating the table, a rotatable shaft, a template, a positive drive between said template and said shaft, said template carrying a pattern for the design to be cut in the mold, a movable cutting tool for the mold, a stylus in contact with the template and connections between the stylus and the cutting tool to move the latter to reproduce the pattern in the mold, an elongated single gear connected to and driven in unison with the rotation of the table, a plurality of gears of graduated sizes fixed to the rotatable shaft for driving the template, a shiftable shaft, and a set of idler gears fixed to said shiftable shaft in constant mesh with the single gear and shiftable along the gear while in mesh therewith to be brought into mesh with the plurality of gears selectively, the plurality of gears being provided with numbers of teeth which are multiples of a common denominator and are in alignment only at predetermined spaced points about the gears, whereby said idler gears may be shifted only at equal divisions of the complete cycles of the table and the rotatable shaft, the relation of the gears being such that the shift from the engaged gear to the next selected gear is substantially instantaneous while said idler gears are in said constant mesh to maintain constant alignment.

2. A tire mold engraving machine comprising the combination of a rotatable mold supporting table, means for rotating the table, a rotatable shaft, a template, a positive drive between said template and said shaft, said template carrying a pattern for the design to be cut in the mold, a movable cutting tool for the mold, a stylus in contact with the template and connections between the stylus and the cutting tool to move the latter to reproduce the pattern in the mold, an elongated single gear connected to and driven in unison with the rotation of the table, a plurality of gears of graduated sizes fixed to the rotatable shaft for driving the template, a shiftable shaft, a set of idler gears fixed to said shiftable shaft in constant mesh with the single gear and shiftable along the gear while in mesh therewith to be brought into mesh with the plurality of gears selectively, the plurality of gears being provided with numbers of teeth which are multiples of a common denominator and are in alignment only at predetermined spaced points about the gears, whereby said idler gears may be shifted only at equal divisions of the complete cycles of the table and the rotatable shaft, the relation of the gears being such that the shift from the engaged gear to the next selected gear is substantially instantaneous while said idler gears are in said constant mesh to maintain constant alignment, and means associated with the plurality of gears to indicate when the teeth are in alignment.

ARTHUR H. KIEHL.

REFERENCES CITED

The following references are of record in the file of this patent:

UNITED STATES PATENTS

| Number | Name | Date |
|---|---|---|
| 1,505,579 | Breitenstein | Aug. 19, 1924 |
| 1,797,139 | Gorton | Mar. 17, 1931 |
| 1,974,919 | Harris et al. | Sept. 25, 1934 |
| 2,143,258 | Bickel | Jan. 10, 1939 |